US007838059B2

(12) United States Patent
Reddy et al.

(10) Patent No.: US 7,838,059 B2
(45) Date of Patent: *Nov. 23, 2010

(54) METHODS FOR THE REDUCTION OF MOISTURE VARIABILITY IN LARGE CHEESE BLOCKS

(75) Inventors: Divya Shree Reddy, Lake Zurich, IL (US); Gary Francis Smith, Glenview, IL (US); David Webb Mehnert, Lake Villa, IL (US); Carie Lynn Wolters, Battle Creek, MI (US)

(73) Assignee: Kraft Foods Global Brands LLC, Northfield, IL (US)

( * ) Notice: Subject to any disclaimer, the term of this patent is extended or adjusted under 35 U.S.C. 154(b) by 951 days.

This patent is subject to a terminal disclaimer.

(21) Appl. No.: 11/566,475

(22) Filed: Dec. 4, 2006

(65) Prior Publication Data

US 2007/0098872 A1    May 3, 2007

Related U.S. Application Data (63) Continuation-in-part of application No. 11/276,914, filed on Mar. 17, 2006, which is a continuation-in-part of application No. 11/087,981, filed on Mar. 23, 2005, now Pat. No. 7,560,129.

(51) Int. Cl.
*A23L 19/00* (2006.01)

(52) U.S. Cl. ........................ 426/582; 426/491; 426/512; 426/580

(58) Field of Classification Search ................. 426/310, 426/334, 478, 491, 512, 580, 582
See application file for complete search history.

(56) References Cited

U.S. PATENT DOCUMENTS

| 2,766,568 | A |   | 10/1956 | Tasker |         |
|-----------|---|---|---------|--------|---------|
| 3,404,009 | A |   | 10/1968 | Lambert et al. | |
| 4,049,838 | A |   | 9/1977  | Krueger et al. | |
| 4,869,161 | A |   | 9/1989  | LaCount | |
| 5,146,845 | A | * | 9/1992  | Pittelko | ........................ 99/454 |
| 5,520,934 | A |   | 5/1996  | Meilleur | |
| 6,180,153 | B1|   | 1/2001  | Palus et al. | |
| 6,458,397 | B1|   | 10/2002 | Abler | |
| 6,701,830 | B2|   | 3/2004  | Rose et al. | |
| 6,916,500 | B2|   | 7/2005  | Abler | |
| 7,560,129 | B2| * | 7/2009  | Mehnert et al. | ............. 426/582 |

* cited by examiner

*Primary Examiner*—Leslie Wong
(74) *Attorney, Agent, or Firm*—Fitch, Even, Tabin & Flannery (57) ABSTRACT

The present invention is directed to processes for making blocks of cheese having reduced moisture variability using controlled cooling of cheese curd to form the final cheese blocks.

20 Claims, 9 Drawing Sheets

METHODS FOR THE REDUCTION OF MOISTURE VARIABILITY IN LARGE CHEESE BLOCKS

RELATED APPLICATIONS

This is a continuation-in-part of U.S. patent application Ser. No. 11/276,914, filed on Mar. 17, 2006, which was a continuation-in-part of U.S. patent application Ser. No. 11/087,981, filed on Mar. 23, 2005, now U.S. Pat. No. 7,560,129, both of which are hereby incorporated by reference.

FIELD OF THE INVENTION

The present invention generally relates to cheese manufacture and more particularly it relates to processes for the production of large sized blocks or barrels of cheese having reduced moisture variability within the blocks or barrels. The processes of this invention use controlled cooling to provide the reduced moisture variability within the block or barrel of cheese.

BACKGROUND OF THE INVENTION

Natural cheese of the American type (e.g., Cheddar, Monterey Jack, or Colby) is manufactured by coagulating ripened milk of proper acidity with rennet, cutting the coagulant, and cooking the resulting curd, whereupon the curd is pressed and further whey removal is effected. The desired flavor, aroma, and texture of the cheese is obtained by curing which involves holding the cheese for a time at desired temperatures.

The moisture content of hard cheeses is important as it impacts the texture of the product. The fat content of hard cheeses is important as it significantly influences the sensory properties thereof by aiding the production of flavor, aroma, and body in cured cheese. The minimum milk fat and maximum moisture content of most cheeses is regulated by Federal and state regulations. For example, in the United States, hard cheddar cheese should have a minimum milk fat content of 50 percent by weight of the solids, and a maximum moisture content of 39 percent by weight. However, reduced fat and low fat cheeses are desired by many consumers, which typically have lower fat content and higher moisture content than the standard hard cheeses. In order to comply with U.S. Standards of Identity applicable to reduced fat cheddar cheeses, for instance, cheddar cheese may be manufactured to contain approximately 33 percent less fat and up to approximately 20 percent more moisture than standard cheddar cheese.

Natural cheeses, including reduced fat natural cheeses, have been produced in a variety of unit sizes. In cheese production, however, it is desirable to produce large rectangular blocks of cheese which, for example, may weigh greater than about 500 pounds (and typically about 640 pounds). These large blocks of cheese can be conveniently divided into smaller blocks or shredded, and packaged for retail. In conventional production of such large blocks of cheese, cheese curd is separated from free whey, and then the drained curd is placed in a bulk container for pressing. In the instance of cheese blocks, the container is provided with openings through which the whey drains as the curd is pressed. This procedure is varied somewhat for the manufacture of cheese barrels, in which the cheese curd may be sealed prior to and during pressing. Generally, such cheese blocks or barrels may be made using a single block fill method or apparatus or a block forming tower method or apparatus.

It is common practice in the manufacture of cheddar and like types of cheese to cool the large pressed blocks of cheese from the manufacturing temperature of about 85-90° F. to a refrigerated temperature of about 32-40° F. Such large blocks of cheese take multiple days to cool from the manufacturing temperature of 85-90° F. to the cold room temperature of about 32-40° F. The cheese is then stored under conditions and for a period of time conducive for curing the cheese.

In the making of large cheese blocks, it is desirable that the moisture content be uniform throughout the block. In prior cheese manufacture, however, a moisture gradient has been observed to occur in the cheese blocks during the cooling period. Moisture has tended to migrate from the core or central region of the cheese blocks towards the exterior surfaces. For instance, over the first several days as cheese cools in bulk containers, moisture is drawn from the warmer interior of the block or barrel to their cooler exterior. For example, single 640 pound blocks of reduced fat cheddar commonly have been observed having an interior moisture of about 44 percent and an external moisture of about 49 percent. The moisture gradient makes it more difficult to form a cheese block having uniform texture throughout. The exterior surface regions of the cheese block may have a firm, smooth texture while the core or central portions of these cheeses may be crumbly or cracked, leading to inferior or waste portions. When the cheese is converted to retail pieces (e.g., 8 oz. chunk or shreds), it is difficult to deal with both the dry center portions and the very moist edges. From a consumer's perspective, cheese from the center often is perceived differently from that at the edge, and the latter variety is preferred by the consumers from an organoleptic standpoint. Moreover, when manufacturing reduced fat cheese or high moisture dry salted cheeses, high moisture target levels may be difficult to achieve without the excessive use of cold wash water. The addition of wash water creates a problem for downstream whey processing and waste water treatment, which is relatively costly.

It has been proposed to rest the cheese blocks at the manufacturing temperature for a period of time before cooling them to permit them to equilibrate. However, in reduced fat (higher moisture) content cheeses in particular, resting the cheese after manufacture and prior to cooling, may lead to increased microbial loads in the finished food product.

It also has been known to accomplish the draining and the pressing of the curd with round probes inserted in the curd to assist in the draining of the whey. However, after removal of these round probes, soft white spots have been left in the curd mass where the curd did not fuse satisfactorily, and moisture variations from point to point within the block have been greater than desired. Various treatments of the curd blocks prior to and during curing have not overcome the problem. It has also been known to use a generally V-shaped perforated pressure plate in connection with the pressing of the curd, as shown in U.S. Pat. No. 3,404,009. However, this pressure plate was primarily designed to remove air and is not adapted for the manufacture of large blocks of cheese. Blocks of cheese also have been rotated during curing in an effort to reduce the occurrence of moisture gradients. Such block rotation procedures are labor intensive and add to the manufacturing costs.

There remains a need for new approaches that will provide an improved process for manufacturing large blocks of cheese, such as reduced fat higher moisture cheeses, with more uniform distribution of moisture and texture throughout the cheese block and which reduce the use of excess water. The present invention provides such processes.

SUMMARY OF THE INVENTION

The present invention is directed to processes for making large blocks or barrels of cheese having reduced moisture variability through its thickness. For purposes of this invention, a "large block" of cheese is intended to include three dimensional blocks or other shapes (including barrels) having minimum weight of at least about 500 pounds. It has now been found that it is possible to reduce moisture variability throughout such large blocks by controlled cooling of the blocks. Generally, the moisture content of large blocks or barrels of cheese produced by the present methods will vary by about 2 percent or less (generally as measured from near the center of the block or barrel to a location near one of the edges).

In a first major embodiment (i.e., the so-called "injection method"), controlled cooling is carried out by effectively and rapidly cooling a middle or central portion of the cheese block(or multiple portions located throughout the cheese block) prior to cooling the entire block. In a second major embodiment (i.e., the so-called "intermediate temperature method") a cheese block at an initial temperature of about 60 to 90° F. is placed in an intermediate temperature cooling room (i.e., temperature of about 10 to 40° F. below the initial temperature but at least about 10° F. above the temperature of a final cooling room) for about 2 to 5 days and then transferred to the final cooling room (i.e., temperature of about 35 to about 45° F.) for about 5 to 8 days.

In the injection method, a number of methods can be used to provide this initial cooling effect. Such methods can include, for example, introducing chilled brine solution, precooled or chilled whey, precooled curd material, or mechanical cooling device (e.g., a tube or plate having circulating coolant) into the middle or central portion of the block or into multiple portions of the block. Generally, the central portion (or multiple portions) of the cheese block is (are) cooled to about 5 to about 50° F., preferably about 10 to about 45° F., and more preferably to about 20 to about 45° F., below the initial temperature of the cheese block (typically about 80 to about 90° F. but can be as low as about 60° F.) prior to the cooling of the cheese block. Generally the initial cooling is carried out immediately before the cheese block is placed in a conventional cooling room.

Although other methods can be used to provide the initial cooling effect, this injection method will be described using the chilled brine solution method. The other methods can easily be employed using the guidance, appropriately modified, provided using the chilled brine solution method.

In injection method using a central injection site only, a form or bulk container having a bottom and sidewalls, and a tube having a fill end and an opposite discharge end, are provided. The tube is vertically positioned at an approximately central axial location of the container such that the discharge end of tube is at or near the bottom of the container. Cheese curd is introduced into the container, and the tube via its fill end. Then, chilled brine is introduced into the tube via its fill end to mix with curd therein. The tube is removed from the cheese curd in the container. The cheese curd is pressed into a curd mass, and then cooled, and thereafter cured, providing a cheese block having reduced moisture variability.

In one preferred embodiment using the injection method, the tube is positioned in the container with its discharge end resting on the bottom of the container or in close proximity thereto (i.e., generally with the discharge end within about 8 inches and preferably within about 2 inches of the bottom). Preferably, the discharge end of the tube rest on the bottom of the container. After filling with the chilled brine solution, the tube preferably is removed from the cheese curd by raising the tube, approximately vertically, out of the container, in order to help ensure that the brine solution is introduced in the central axial region of the cheese curd mass. Preferably, the chilled brine (or chilled whey, if used) has a salt content which approximately matches the salt content of the moisture phase of the cheese curd.

Generally the cross sectional area of the central tube used in the injection method is about 1.5 to about 25 percent and more preferably about 5 to about 20 percent of the total cross sectional area of the block. The tube may comprise a cross-sectional diameter of about 7 inches to about 9 inches. Where more than one tube is used, the tubes may, of course, have smaller diameters. The tube may comprise a unitary self-supporting hollow member comprised of a wall material selected from the group consisting of polymer, metal, ceramic, and wood. Although the tube preferably has a circular cross section, tubes have other cross sections (e.g., square, rectangular, oval, and the like) can be used. More than one tube can be used so long as the cooling of the central portions is effective. The brine solution preferably is introduced into the tube positioned within the container as a salt solution at about 25 to about 30° F. having a salt content which is approximately the same as the salt content in the moisture phase of the cheese curd. In one particular embodiment, the cheese curd has a salt content of about 4 to about 6 percent into which the brine solution is introduced as about 4 to about 6 percent salt solution at about 25 to about 30° F., and more particularly as about 4.5 to about 5.5 percent salt solution at about 25 to about 27° F. In one preferred embodiment, the brine solution is introduced into the tube at a rate of about 10 to about 25 pounds of the about 4 to about 6 percent brine solution per 640 pounds of cheese curd, and more preferably about 12 to about 15 pounds of the 4-6 percent brine solution per 640 pounds of cheese curd. Comparable rates for other sized cheese blocks can be used.

In the second major embodiment (i.e., intermediate temperature method), controlled cooling is effected by providing an intermediate temperature cooling room (i.e., temperature between that of the initial fill temperature and the final cooling room). This method comprises providing a bulk container having a bottom and sidewalls; introducing cheese curd having an initial temperature into the container; pressing the cheese curd to form a cheese block; cooling the pressed cheese block at an intermediate temperature to form a partially cooled cheese block for a first cooling period; cooling and curing the partially cooled cheese bock at a final temperature and for a second cooling period, thereby providing a final cheese block having reduced moisture content variation between a geometric center and side edges thereof; wherein the cheese block has a weight of at least about 500 pounds; wherein the initial temperature is about 60 to about 90° F., wherein the intermediate temperature is about 10 to about 40° F. below the initial temperature and at least about 10° F. above the final temperature, wherein the final temperature is about 35 to about 45° F., wherein the first cooling period is about 2 to about 5 days, wherein the second cooling period is about 5 to about 8 days, and wherein the first and the second cooling periods are sufficient to cool the final cheese block to less than about 45° F.

In this intermediate temperature method, the formed cheese blocks having an initial temperature (i.e., the fill temperature at which the initial cheese blocks are formed) are placed in an intermediate temperature cooling room for about 2 to about 5 days before being placed in a final temperature cooling room for the remainder of the cooling period (i.e., a second cooling period). Generally the length of total cooling period (i.e., the sum of the first and second cooling periods) is about 8 to about 12 days; it should be sufficient to cool the cheese block to below about 45° F. The initial temperature ($T_{inital}$) is higher than the intermediate temperature ($T_{intermediate}$) which is higher than the final temperature ($T_{final}$); in other words, $T_{inital} > T_{intermediate} > T_{final}$.

Generally in the controlled temperature processes of this invention, the cheese curd is pressed into a cheese mass having dimensions (i.e., diameter, length, width, and/or height depending on actual shape) of about 24 to about 30 inches, which upon cooling using the processes disclosed herein, has significantly reduced moisture variability between a location at a geometric center and a side edge portion thereof. In referring to the cheese block of this invention, The absolute value of this reduced moisture variability will depend, at least in part, on the initial temperature of the filled cheese curd. Generally, the lower the initial temperature of the cheese curd, the lower the absolute value of the reduced moisture variability. For example, if the cheese curd has an initial temperature of about 60° F., the moisture content is expected to vary by about 1 percent or less (and preferably less than about 0.5 percent) from a location at a geometric center and a side edge portion. If the cheese curd has an initial temperature of about 90° F., the moisture content is expected to vary by about 2 percent or less (and preferably less than about 1.25 percent) from a location at a geometric center and a side edge portion. Regardless of the initial temperature of the cheese curd, cheese block products made by the processes of this invention have reduced moisture variability as well as improved uniformity in texture and/or other sensory properties between the central and side portions of the cheese block products as compared to similar cheese block products made by conventional processes. The relative improvement in moisture variability is at least about 50 percent, preferably at least about 75 percent, and most preferably at least about 90 percent.

This controlled cooling process is especially useful in the production of hard cheeses, such as Cheddar, Monterey Jack, or Colby cheeses. The process can be used to provide low moisture variability in cheese blocks of a wide variety of shapes, including cheese blocks having substantially symmetrical cross-sectional shapes, such as square, rectangular, triangular, circular, and the like as well as irregular cross-sectional shapes. The form or container may have a cross-sectional geometry corresponding to that of the desired cheese product.

This controlled cooling process is also applicable to the manufacture of reduced fat, high moisture content varieties of these and other hard cheeses. This process extends the capability of cheese manufacturing systems to produce bulk cheese at higher total moisture with less strain on downstream whey and waste water processing, thereby providing cost savings.

Features, dimensions, and sizes depicted in the figures are illustrative only, and are not necessarily to scale.

DETAILED DESCRIPTION

Figure 1:
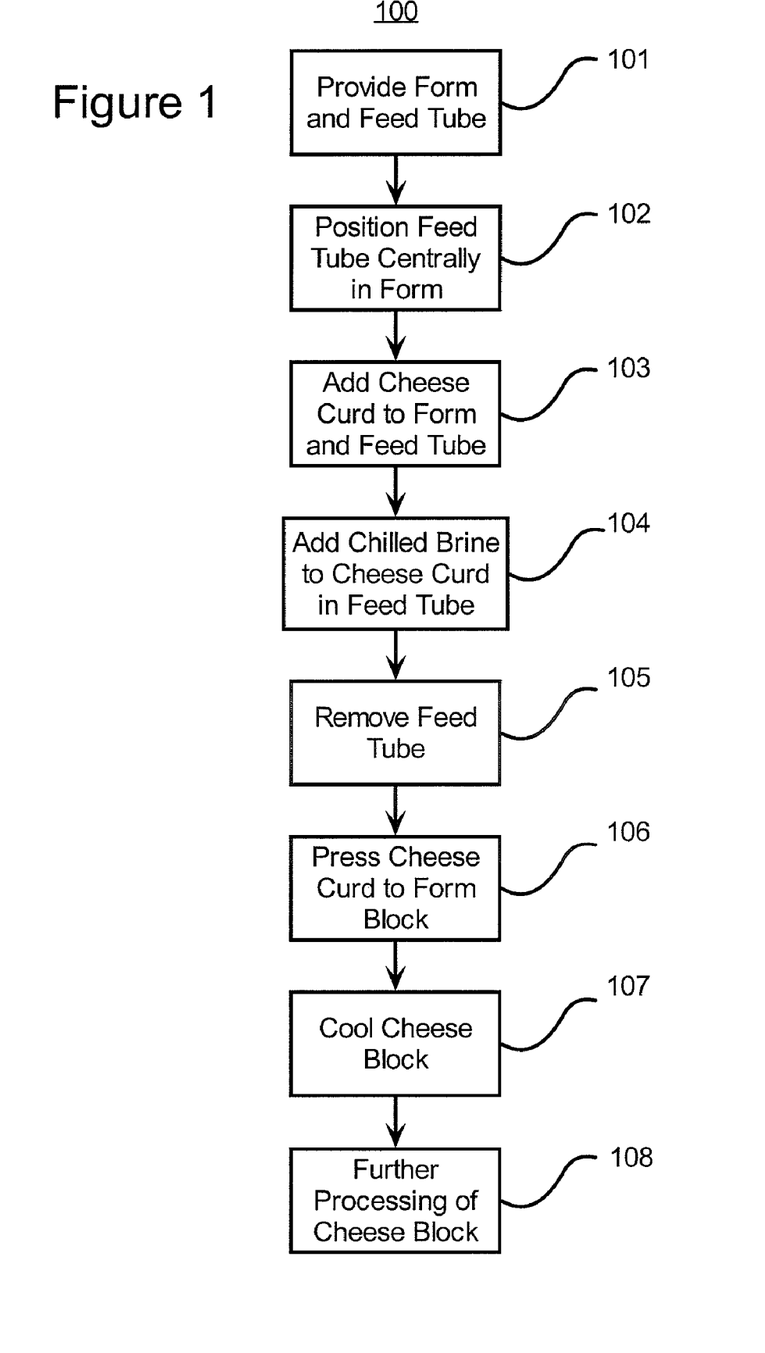
FIG. 1 is a flow chart describing a process for making cheese having reduced moisture variability through its thickness according to an embodiment of this invention.

Referring to FIG. 1, a process 100 is shown for making a block of cheese having reduced moisture variability through its thickness in accordance with an injection embodiment of the invention. In step 101, a form or bulk container having a bottom and sidewalls, and a tube having a fill end and an opposite discharge end, are provided. In step 102, the discharge end of the tube is positioned at an approximately central axial location of the container. In step 103, cheese curd is introduced into the container, and the tube via its fill end. In step 104, a chilled brine is introduced into the tube via its fill end to mix with curd therein. In step 105, the tube is removed from the cheese curd in the container. In step 106, the cheese curd is pressed into a curd block. In step 107, the cheese block is then cooled, providing a cheese block having reduced moisture variability. Thereafter, in step 108, it is further processed in a conventional manner. For example, it may be cured, providing a cheese block having reduced moisture variability. The cooled cheese block may be packaged prior or after curing, and then, after curing, the block may be cut into smaller blocks or pieces or shredded, and then wrapped for commercial distribution.

Figure 2:
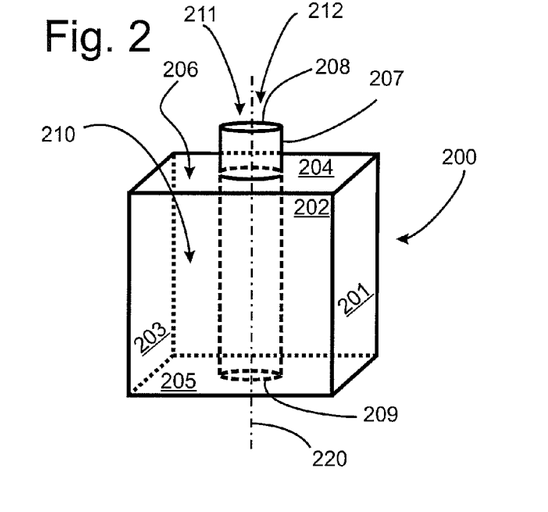
FIG. 2 is a perspective view of an arrangement of a form and a tube used in the process described in FIG. 1 for making a rectangular block shaped cheese product.

Referring to FIG. 2, a form or container 200 for holding and molding cheese curd is shown having sidewalls 201, 202, 203, 204 and a bottom 205 which define a cavity 206. The container 200 is open-ended at the top and includes moisture-sealing inner sidewalls (e.g., metal, plastic, or wood). The form or container 200 generally has a three-dimensional internal geometry corresponding to that of the desired cheese product. A feed or injector tube 207 is inserted into the cavity 206. The tube is oriented generally coincident with the central longitudinal axis 220 of the container 200. In this manner, it is spaced a substantially equal distance from each of the sidewalls 201, 202, 203, 204 of the container 200. The tube 207 has a fill end 208 and an opposite discharge end 209 which preferably is positioned to rest (flush) on the bottom 205 of the form 200. The discharge end 209 generally is located at a central axial position of the bottom of the container 205. Cheese curd is introduced into the container cavity 206 as indicated by arrow 210 and inside the tube 207 as indicated by arrow 211 to fill each of the container 200 and tube 207. The tube preferably is filled with curd to the same height as the cavity area of the form outside the tube. For example, the curd may be discharged from a cyclone separator through its outlet end into the container and the tube.

Then, a chilled brine solution is introduced into the tube 207 as indicated by arrow 212. The brine solution flows downward through the interstices in the cheese curd inside the tube 207 under gravity flow. Within several minutes (e.g., 1-2 minutes) of introducing the brine solution, the tube 207 is removed from the cheese curd in the container. The tube 207 preferably is removed from the cheese curd by raising the tube, approximately vertically (i.e., approximately parallel to axis 220), out of the container, in order to help ensure that the brine solution is left in the central axial region of the cheese curd mass as the tube is extracted. The tube 207 may be manually or mechanically lifted out of the container 200. If the curd is particularly firm, a mechanical devise may be used to remove the tube from the barrel or block. In an alternative embodiment multiple tubes may be inserted in the central axial region of the container into which cheese curd and/or brine solution my be introduced therein.

The chilled brine solution preferably is introduced into the tube 207 positioned within the container 200 as an aqueous salt (NaCl) solution at about 25 to about 30° F. having a salt content which is approximately the same as the salt content in the moisture phase of the cheese curd. In one particular embodiment, the cheese curd has a salt content of about 4 to about 6 percent into which the brine solution is introduced as about 4 to about 6 percent salt solution at about 25 to about 30° F., and more particularly as about 4.5 to about 5.5 percent salt solution at about 25 to about 27° F. In one preferred embodiment, the brine solution is introduced into the tube at a rate of about 10 to about 25 pounds of the 4-6 percent brine solution per 640 pounds of cheese curd, and more preferably about 12 to about 15 pounds of the 4-6 percent brine solution per 640 pounds of cheese curd.

Generally the cross sectional area of the tube is about 2.5 to about 25 percent and more preferably about 5 to about 20 percent of the total cross sectional area of the block. In the manufacture of rectangular cheese blocks weighing approximately 600-700 pounds, or barrel (annular) shaped cheese blocks weighing approximately 500-600 pounds, the tube 207 generally may comprise a cross-sectional diameter of about 7 to about 9 inches. Or if multiple tubes, the diameters of the individual tubes should supply approximately the same cross-section area as the single tube of about 7 to about 9 inches. The tube 207 may comprise a unitary self-supporting hollow member comprised of a wall material selected from the group consisting of polymer, metal, ceramic, and wood. For instance, the tube may be polyvinylchloride (PVC) or stainless steel construction.

After the brine solution is introduced into tube 207 and the tube is lifted out of the container 200, the cheese curd can then be pressed or vacuum pressed into a block, cooled, cured, subdivided, and packaged in conventional manners. For instance, rectangular blocks of cheese typically are allowed to drain during pressing, and then are plastic wrapped before subsequent processing. Suitable techniques for pressing the cheese blocks include those conventionally known and used (e.g., see U.S. Pat. No. 4,049,838, which is incorporated herein by reference). Barrel or annular shaped blocks of cheese typically are sealed before and during pressing. For cooling, the freshly pressed cheese curd block typically will be cooled from a temperature of about 85 to about 90° F. to temperature of about of about 32 to about 40° F. over a period of about 3 to about 10 days. The cheese may then be stored in a curing chamber under controlled conditions.

Figure 3:
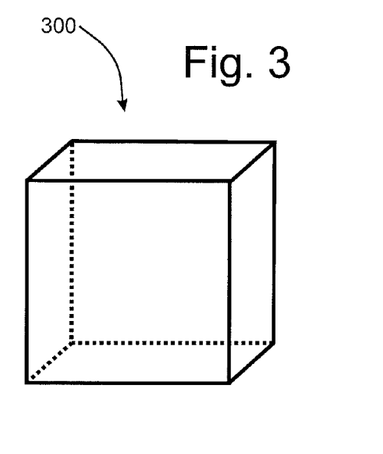
FIG. 3 shows a cheese product made using the equipment illustrated in FIG. 2.

FIG. 3 shows a rectangular cheese block product 300 made using the process described in FIG. 1 with a form as illustrated in FIG. 2. The cheese blocks may be subdivided into smaller blocks or pieces, or shredded. For example, the cheese blocks may be packaged after pressing and before cooling, and then can be rewrapped after any subdividing operation is performed before or after curing.

Figure 4:
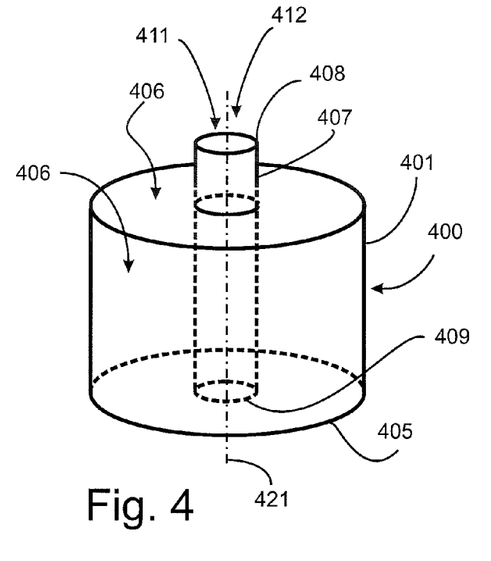
FIG. 4 is a perspective view of an arrangement of a form and a tube used in the process described in FIG. 1 for making a barrel (annular) shaped cheese product.
Figure 5:
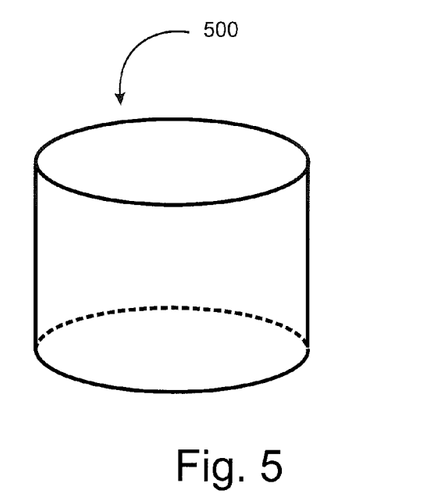
FIG. 5 shows a cheese product made using the equipment illustrated in FIG. 3.

FIG. 4 is a perspective view of an arrangement of a cylindrical form 400 and tube 407 used in the process described in FIG. 1 for making a barrel (annular) shaped cheese product. The form or container 400 for holding and molding cheese curd is shown having sidewalls 401 and a bottom 405 which define a cavity 406. A feed tube 407 is inserted into the cavity 406. The tube is oriented generally coincident with the central longitudinal axis 420 of the container 400. In this manner, it is spaced a substantially equal distance from the sidewall 401 of the container 400. As indicated above, the tube 407 has a fill end 408 and an opposite discharge end 409, the latter of which preferably rests on or near the bottom 405 of the form 400. The discharge end 409 generally is located at a central axial position 421 of the bottom 405 of the container 400. Cheese curd is introduced into the container cavity 406 as indicated by arrow 410 and inside the tube 407 as indicated by arrow 411 to fill each of the container 400 and tube 407. The tube preferably is filled with curd to the same height as the cavity area of the form outside the tube. Then, a chilled brine solution is introduced into the tube 407 as indicated by arrow 412. As indicated above, the brine solution flows downward through the interstices in the cheese curd inside the tube 407 under gravity flow. Within several minutes (e.g., 1-2 minutes) of introducing the brine solution, the tube 407 is removed from the cheese curd in the container. Similar to the prior discussion in regard to FIG. 2, the cheese mass is then pressed, cooled, and cured and otherwise processed in conventional manners. As indicated above, the barrel cheese typically is handled somewhat differently from the rectangular block cheese in that the barrel cheese is vacuum sealed in its plastic liner and fitted with the container top so as to be sealed at its exterior sides during pressing, and thus is not allowed to drain during pressing. FIG. 5 shows a barrel (annular) cheese block product 500 made using the process described in FIG. 1 with a form as illustrated in FIG. 4.

The introduction of the chilled brine into the core of the cheese curd mass before pressing, cooling, and curing has been found to counteract and significantly reduce moisture gradients from arising through the thickness of the cheese block, and especially between the central region and side regions of the cheese block.

In an alternative, but less preferred, injection embodiment, cheese curd may be filled into a form or container before the tube is inserted inside the container. The tube is inserted into freshly barreled/blocked cheese already prefilled into the form. In this arrangement, the top lip of the tube preferably is rolled to provide a hand grip and the bottom edge of the tube is sharpened or beveled to facilitate insertion of the tube into the curd. Mechanical pressing of the tube into the prefilled container may be required if the pressed cheese is very firm. Then the brine is introduced as described above.

Figure 8:
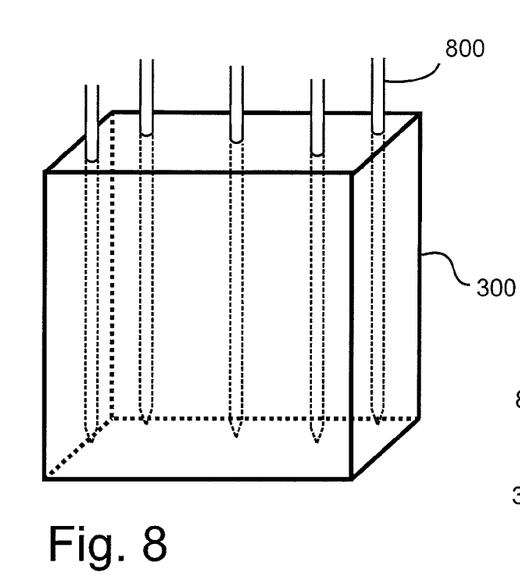
FIG. 8 illustrates another embodiment wherein a plurality of cooling tubes are used to provide cooling to a plurality of locations within a cheese block.
Figure 9:
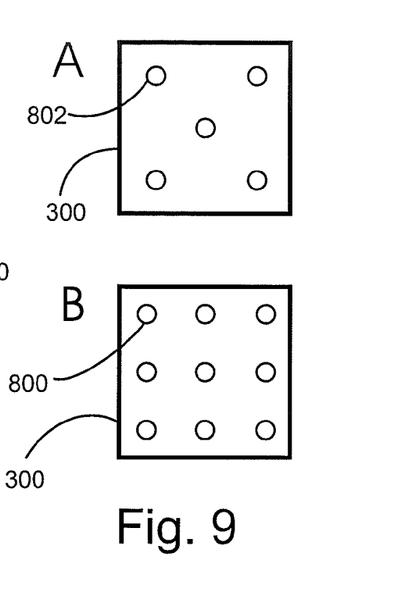
FIG. 9 provides a top view of two alternative patterns (A and B) for the plurality of cooling tubes inserted into the cheese block according to the embodiment of FIG. 8.
Figure 10:
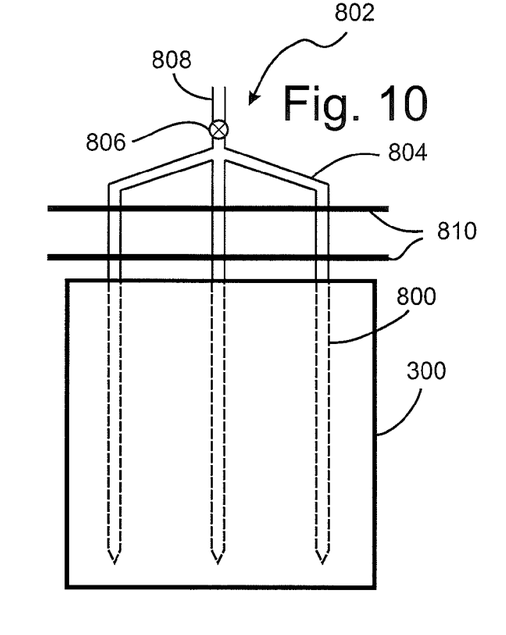
FIG. 10 provides a side view of the cheese block and the plurality of cooling tubes inserted into the cheese block according to the embodiment of FIG. 8.

In any of the injection embodiments described above, more than one cooling tube can be used to provide the initial cooling. FIG. 8 illustrates a cheese block 300 having a plurality (in this case 5) cooling tubes. FIG. 9 illustrates the top of cheese block 300 with various placements of the cooling tubes 800. FIG. 9A has five cooling tubes 800; FIG. 9B has nine such tubes 800. FIG. 10 provides a side view of cheese block 300 having a cooling tube manifold 802 having cooling tubes or wands 800 which are supplied by feeder lines 804 from supply line 808 using flow control value 808. A bracing structure 810 (partially shown) is positioned over the cheese block 300 to hold and stabilize the cooling tube manifold 802 during use. The use of a plurality of cooling tubes allows additional control over the cooling of the cheese block and reduced moisture value variability throughout the cheese bock.

Figure 11:
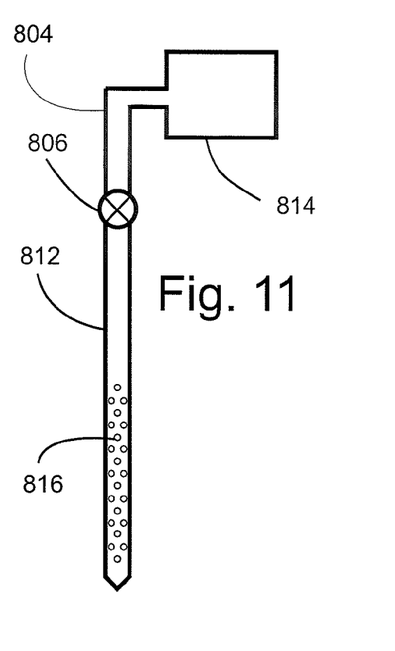
FIG. 11 illustrates a cooling tube which can be used for injecting cooling medium into a cheese block.

FIG. 11 illustrates a modified cooling tube or wand 812 having a plurality of outlet openings 816 (generally diameters less than about 1 inch and preferably of about 0.5 to about 1 inch) through which the cooling medium can be introduced into the cheese block. The cooling medium (gas or liquid) from supply tank 814 is supplied through supply line 808 to the cooling tube 812 via flow supply value 803. Suitable gases for use with this type of cooling tube include, for example, nitrogen, air, and the like; generally, the cheese block is sufficiently porous so that the gas escapes during subsequent processing steps. This type of cooling tube can be used in any of the embodiments discussed above.

Although the injection method has been described in detail using the chilled brine method to initially the cool the central portion of the cheese block, other methods to provide this initial cooling can be used. Such methods can include, for example, introducing precooled curd material or a mechanical cooling device (e.g., a tube or plate having circulating coolant) into the middle or central portion of the block rather than the chilled brine solution.

Figure 12:
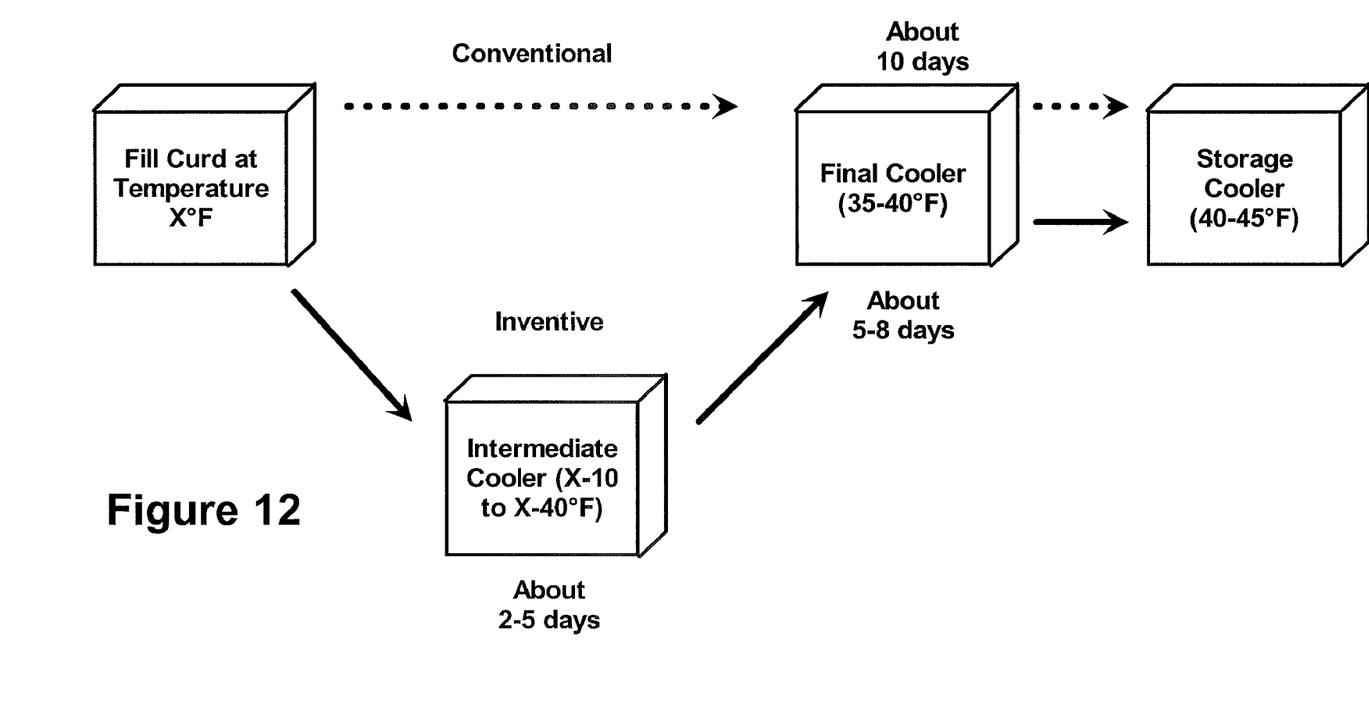
FIG. 12 is a schematic illustrating the intermediate temperature method (solid arrows) of this invention and comparing it to the conventional cooling method (broken arrow)

Referring to FIG. 12, the intermediate temperature embodiment or process for making a block of cheese having reduced moisture variability through its thickness is illustrated and compared with the conventional cheese block cooling process. The inventive process is shown with solid arrows and the conventional process with broken arrows. For both the conventional process and the inventive process, the form is filled with curd at a temperature of X° F.(typically about 60 to about 90° F. depending on the specific cheese variety used) and then pressed or otherwise treated to form the desired cheese block. In the conventional process, the cheese block is placed directly in the final cooler or final cooling room at a temperature of about 35 to about 40° F. for about 10 days, after which it is moved into the storage cooler at about 40 to about 45° F. In such a process, the variability of the moisture content throughout the cheese block can be significant (e.g., absolute differences of up to about 5 percent moisture have been observed between the central and outer portions of cheese blocks).

In the inventive intermediate temperature process shown in FIG. 12, the form is filled with curd at a temperature of X° F.(typically about 60 to about 90° F. depending on the specific cheese variety used) and then pressed or otherwise treated to form the desired cheese block. The cheese block is then placed in an intermediate cooler (i.e., a cooler having a temperature between that of the initial fill temperature and that of the final cooler) for about 2 to about 5 days (preferably about 3 to 4 days). After intermediate cooling, the cheese block is placed in the final cooler at a temperature of about 35 to about 40° F. for about 5 to about 8 days (preferably about 6 to 7 days) after which it is moved into the storage cooler at about 40 to about 45° F. Typically, the temperature of the intermediate cooler is about (X-10) to about (X-40)° F.(preferably about (X-15) to about (X-25)° F.), but at least about 10° F.(and preferably at least about 20° F.) above the final cooler temperature. Using such controlled cooling, the moisture variability of the cheese block can be reduced to less than an absolute difference of about 2 percent (and preferably less than about 1 percent). Generally, the total cooling period (i.e., the sum of time in the intermediate cooler and the time in the final cooler) is sufficient to bring the temperature of the cheese block to less than about 45° F.; typically, the total cooling time will be about the same as in the conventional process (i.e., about 10 days).

Figure 13:
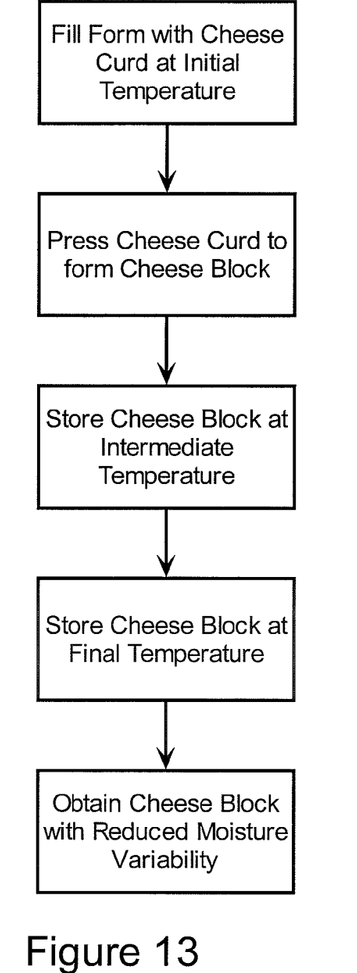
FIG. 13 is a flow chart describing a general process for making cheese having reduced moisture variability through its thickness according to an intermediate temperature embodiment of this invention.
Figure 14:
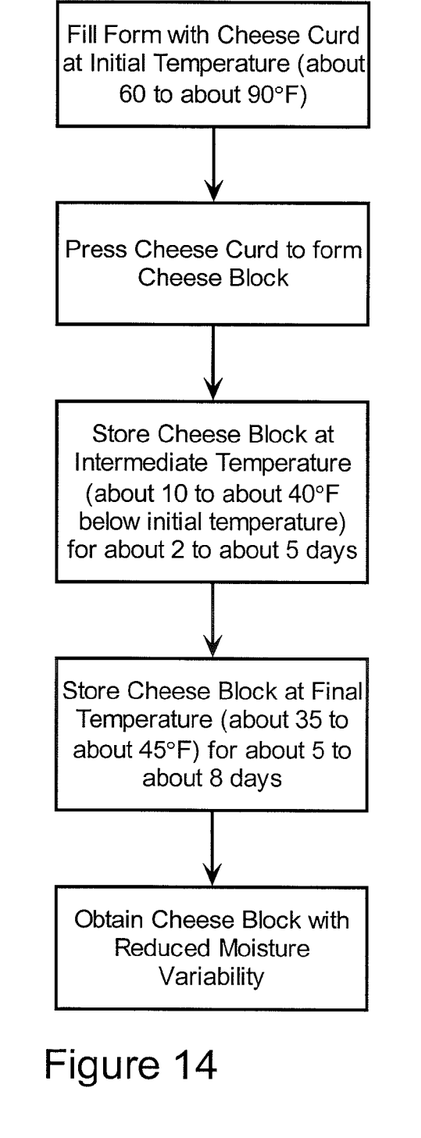
FIG. 14 is a more detailed flow chart describing a process for making cheese having reduced moisture variability through its thickness according to another intermediate temperature embodiment of this invention

As FIGS. 13 and 14 illustrate, cheese curd is filled into an appropriate form at an initial temperature (about 60 to about 90° F. depending on the specific cheese variety used), pressed to form a large cheese block, stored at an intermediate temperature (preferably about 50 to about 80° F. for about 2 to about 5 days and more preferably about 50 to about 70° F. for about 3 to about 4 days), and then stored at a final temperature (preferably about 35 to about 45° F. for about 8 to about 12 days and more preferably about 8 to about 10 days) to obtain the desired cheese block have reduced moisture variability throughout the block.

If desired, the injection and intermediate temperature embodiments may be combined in a single process. Thus, for example, a cheese curd block may be initially cooled by introducing a chilled brine solution, a chilled whey composition, a chilled cheese curd mixture, a chilled gas, or a cooling device having a recirculating coolant into one or more portion of the cheese curd block and then cooling the resultant cheese block at an intermediate temperature of about 10 to about 40° F. below the initial temperature and at least about 10° F. above the final temperature for a first cooling period of about 2 to about 5 days and then cooling the resultant cheese block at the final temperature of less than about 45° F. for a second cooling period of about 5 to 7 days, wherein the initial cooling in combination with the first and the second cooling periods are sufficient to cool the final cheese block to less than about 45° F.

Figure 15:
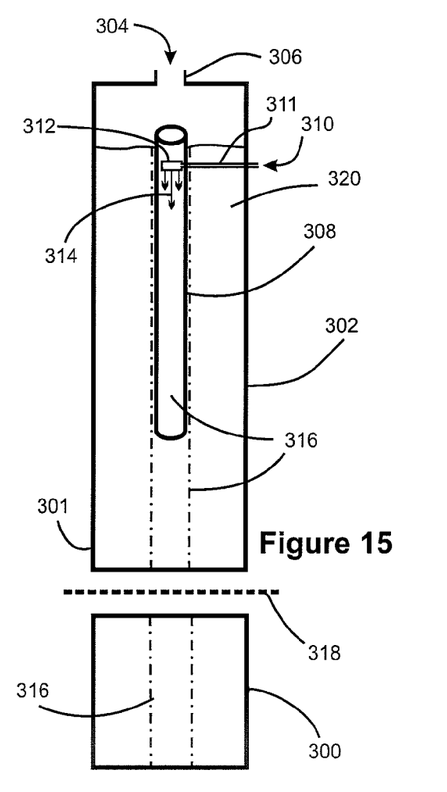
FIG. 15 is a side view of a block forming tower system for preparing cheese blocks using the injection method.
Figure 16:
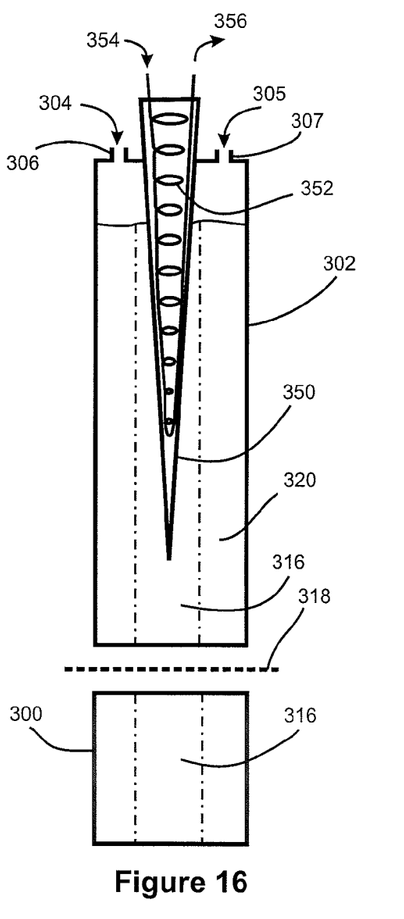
FIG. 16 is a side view of another embodiment of a block forming tower system for preparing cheese blocks using the injection method.

FIGS. 15 and 16 illustrate embodiments of the present invention wherein the injection cooling method of the present invention is applied using a block forming tower system. As shown in FIG. 15, loose curds 304 are introduced into the cooling tower 302 in an essentially continuous manner via entry 306 to form a curd mass 320 which will tend to fuse together due to pressure as it approaches the bottom 301 of the cooling tower 302. Generally, the cooling tower 302 has the same cross-sectional dimensions as the bulk container to receive the cheese block 300 at the discharge end 301 of the tower 302. As the curd mass 320 flows down the cooling tower 302 and cooling cylinder 308, the central portion 316 is cooled by introducing a cooling composition 310 (e.g., a chilled brine solution, a chilled whey composition, a chilled cheese curd mixture, a chilled gas, or the like) into the central portion 316 via line 310 and distributor 312 and then into the hollow cooling tube or wand 308 as indicated by the three small arrows 314. The cooling cylinder 308 has both its top and bottom open, thereby allowing curds 320 to pass through the cooling cylinder 308 to be cooled as well as outside the cooling cylinder. The distributer 312 may have the same general configuration of the wand 812 in FIG. 11 with openings (not shown) for the chilled brine to be introduced into the cheese curds. If the distributer 312 is placed high enough in the tower (i.e., where the curds are loosest), the cooling cylinder 308 could be eliminated (i.e., becomes optional). The cooling tube or wand 308 is shown as a hollow cylindrical tube in FIG. 15. Of course, other shaped cooling tubes or wands can be used. Although not shown, appropriate baffles or transferred lines could be used to direct precooled curds towards the inside or central portion of the cooling tube 308 while directing non-cooled curds to the outside of the cooling tube 308, thereby provided the desired central cooled portion 316. As the fused curd mass 320 reaches the bottom of the cooling tower 301, a cheese block 300 having a cooled central portion 316 can effectively be removed by using knife or other cutting device 318. The cheese block 300 can then be aged to form a large cheese block with reduced moisture variability.

FIG. 16 illustrates a similar cooling tower 302 as shown in FIG. 15 except that two entry ports 306 and 307 are provided for introducing loose curds 304 and 305, respectively, into the cooling tower 302 and that a cooling finger or device 350 is used to cool the central portion 316 of curd mass 320. The cooling finger or device 350 is located inside the cooling tower 302. Cooling of the central portion of the curd 316 is effected by circulating a cooling medium through the coil 352 within the cooling finger. A cooling medium (gas or liquid) enters the coil 352 through entry 354 and exits through outlet 356; the cooling medium from outlet 356 can be rechilled and then recirculated through coil 352. As shown in FIG. 16, loose curd can be introduced through both inlets 306 and 305. Although not shown, precooled loose curds can be introduced through one of the inlets and then directed (e.g., using appropriate baffles or transfer lines) towards the central portion 316 to assist in cooling the central portion 316. The block 300 with cooled central position 316 can be removed using knife or other cutting device 318. The cheese block 300 can then be aged to form a large cheese block with reduced moisture variability.

Figure 17:
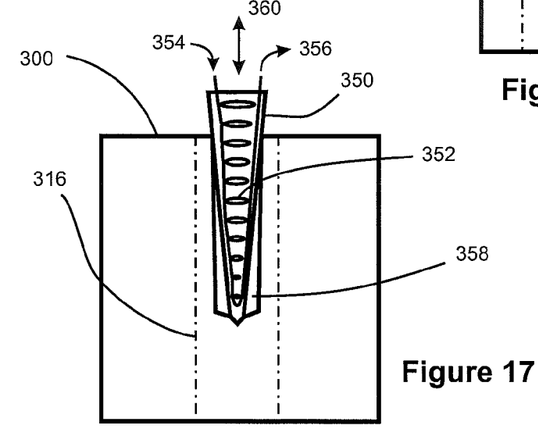
FIG. 17 illustrates an insertable cold finger for controlled cooling of the interior of a cheese block.

FIG. 17 illustrates the use of another cooling finger 350 which is inserted into cheese block 300 to cool the interior portion 316. In this case, the cooling finger 350 is forced into the interior portion 316 by moving the cooling finger in a downward manner as indicated by double arrow 360; once the interior portion 316 is sufficiently cooled, the cooling finger 350 can be removed from the cheese block 300 by pulling it in an upward manner as indicated by the double arrow 360. To increase the heat transfer, the cooling finger 350 can be equipped with fins 358 or other heat transfer means. The cooling medium (gas or liquid) enters the coil 352 through entry 354 and exits through outlet 356; the cooling medium from outlet 356 can be rechilled and then recirculated through coil 352. The cheese block 300 can then be aged to form a large cheese block with reduced moisture variability.

Figure 18:
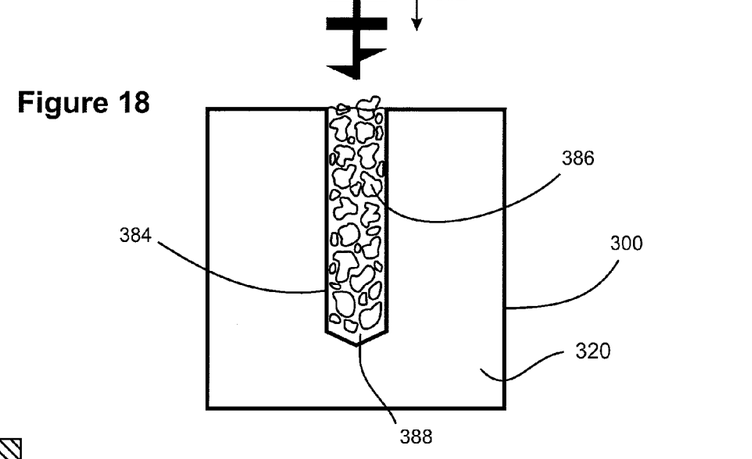
FIG. 18 illustrates the use of a so-called "post hole" method for controlled cooling of the interior of a cheese block.
Figure 19:
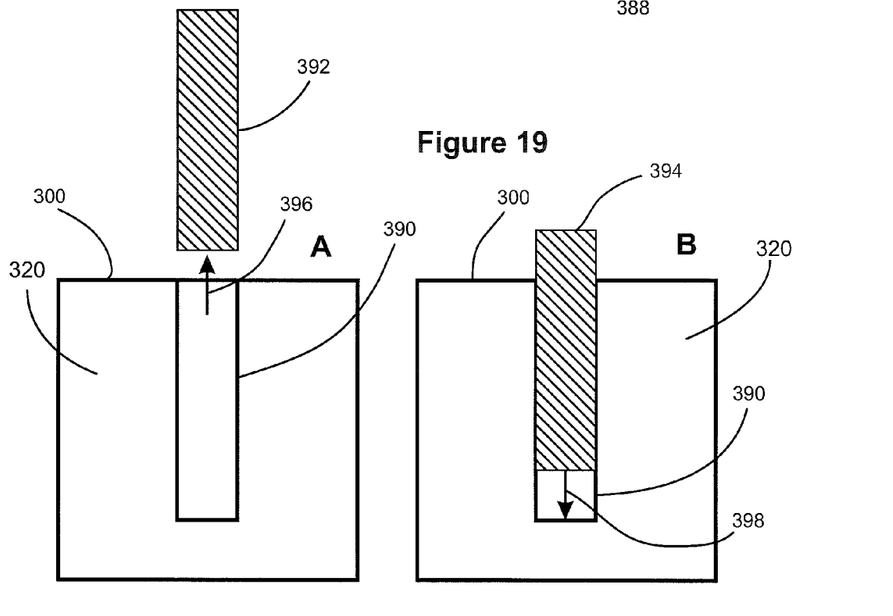
FIG. 19 illustrates the use of a so-called "plug" method for controlled cooling of the interior of a cheese block.

FIGS. 18 and 19 illustrates other means of cooling the interior portion of cheese block 300. In FIG. 18, an auger/grinder 380, which can be moved up and down as indicated by the double arrow 382, is used to form a "post-hole" 384 in the center of the cheese block 300 in such a manner that the "post-hole" contains the loosened or ground curds 386. The sides of this "post-hole" are formed by the fused curd 320. Into this so-called "post-hole," chilled brine 388 or chilled whey liquid could be introduced to cool the central portion of the cheese block. Although not shown, a plurality of such "post-holes" could be used to cool the central portion of cheese block 300. The cheese block 300 can then be aged to form a large cheese block with reduced moisture variability.

In FIG. 19A, a plug 392 of cheese is removed from the cheese block 300 as indicated by arrow 396 leaving a plug-shaped hole 390 in the fused curd 320. The cheese plug 392 is then cooled to the desired temperature to provide a chilled cheese plug 394. The chilled cheese plug 394 is then replaced in the plug-shaped hole 390 as indicated arrow 398 in FIG. 19B. The cheese block 300 containing the chilled cheese plug 394 can then be aged to form a large cheese block with reduced moisture variability. Preferably, the cheese plugs 392 obtained from a plurality of cheese blocks are of uniform dimensions so that they can be placed in any of the cheese blocks. Thus, in a continuous or semi-continuous process, a chilled cheese plug 394 from the $X^{th}$ cheese block could be placed in any of the cheese blocks following the $X^{th}$ cheese block (e.g., the next or the $(X+1)^{th}$ cheese block).

Figure 20:
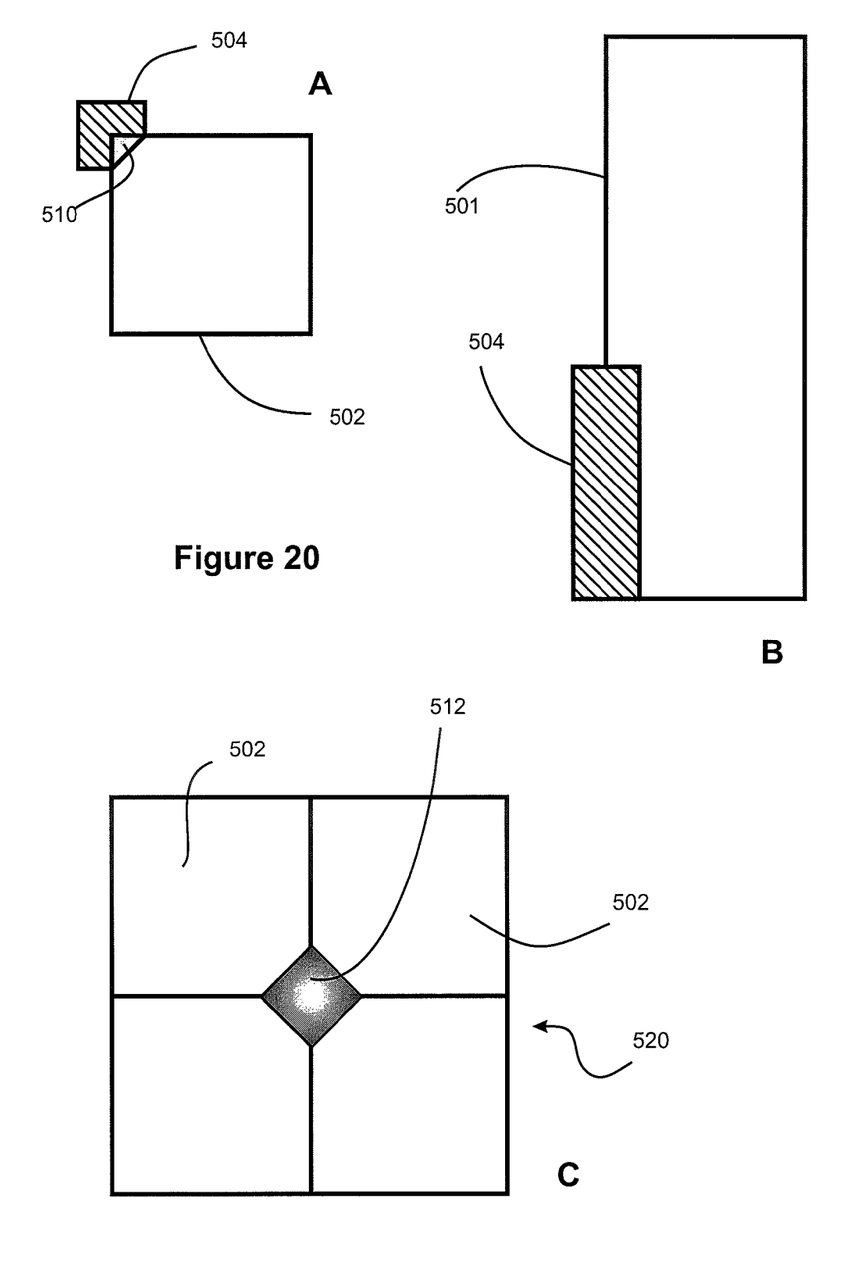
FIG. 20 illustrates the use of multiple small blocks in which corners thereof are cooled and then combined so as to form a larger block having a cooled interior.

FIG. 20 illustrates another method for controlled cooling of a cheese block to reduce moisture variability therein. As shown in FIG. 20A, a corner 510 of cheese block 502 is cooled using chiller 504. This method could be applied to a separately formed cheese block 502 or to a cheese block before it is removed from a cooling tower apparatus as shown in FIG. 20B. After a plurality of cheese blocks 502 are prepared with chilled corners 510, they are arranged as shown in FIG. 20C to form a larger cheese block 520 consisting of individual prechilled cheese blocks 502 whereby a chilled central portion 512 is provided. The cheese block 520 can then be aged to form a large cheese block with reduced moisture variability. The cheese block 520 can be formed of a single layer or multiple layers of individual prechilled cheese blocks 502 so long as the chilled central portion 512 remains within the center of the cheese block 520 as shown in FIG. 20A.

For any of the embodiments described above, the absolute value of this reduced moisture variability will depend, at least in part, on the initial temperature of the cheese curd from which the block is prepared. Generally, the lower the initial temperature of the cheese curd, the lower the absolute value of the reduced moisture variability. For example, if the cheese curd has an initial temperature of about 60° F., the moisture content is expected to vary by about 1 percent or less (and preferably less than about 0.5 percent) from a location at a geometric center and a side edge portion. If the cheese curd has an initial temperature of about 90° F., the moisture content is expected to vary by about 2 percent or less (and preferably less than about 1.25 percent) from a location at a geometric center and a side edge portion. Regardless of the initial temperature of the cheese curd, cheese block products made by the process of this invention have reduced moisture variability as well as improved uniformity in texture and/or other sensory properties between the central and side portions of the cheese block products as compared to similar cheese block products made by conventional processes. The relative improvement in moisture variability is at least about 50 percent, preferably at least about 75 percent, and most preferably at least about 90 percent.

In this manner, cheese block products made by a process of this invention herein have improved uniformity in texture and/or other sensory properties between the central and side portions of the cheese block products. This process is especially useful in the production of hard cheeses, such as Cheddar, Monterey Jack, or Colby cheeses. For example, the process may be used in the manufacture of approximately 640 pound cheddar cheese blocks having dimensions of approximately 26×28×32 inches or 22×28×28 inches (side×side×height), or approximately 540 pound barrel (annular) cheddar cheese blocks having dimensions of approximately 26×32 inches (diameter×height). Of course, other sized blocks or barrels or other shapes can be used if desired. The process can be used to provide low moisture variability in cheese blocks of a wide variety of shapes, including cheese blocks having substantially symmetrical cross-sectional shapes, such as square, rectangular, triangular, circular, and the like.

This process is also applicable to the manufacture of reduced fat, high moisture content varieties of these and other hard cheeses. For example, the process is useful to significantly reduce moisture variation between the side and central regions of reduced fat (e.g., minimum 34 percent fat solids), high moisture (e.g., 40-49 percent moisture) cheeses, including cheddar cheese. This process can thus extend the capability of cheese manufacturing systems to produce bulk cheese at higher total moisture with less strain on downstream whey and waste water processing, thereby providing cost savings.

The Examples that follow are intended to illustrate, and not to limit, the invention. All percentages used herein are by weight, unless otherwise indicated.

EXAMPLE 1

An experimental study was conducted to compare the moisture variability in a cheddar cheese block ("inventive") made with brine core cooling prior to pressing, cooling, and post-processing, in accordance with the injection embodiment of the present invention, with a control cheese block ("control") made in a conventional manner without the core cooling step.

A block of cheddar cheese (22×28×28 inches (side×side×height)) was manufactured by filling a form having internal dimensions suited to provide the desired product size with salted cheddar curd made in a conventional manner. A stainless steel, thin walled cylinder approximately 8 inch in diameter was positioned in the center of the form with its discharge end touching the axial central region of the bottom of the form. Approximately 640 pounds of cheese curd (67° F.) was then filled into the container and the inside of the tube. The tube was filled with curd to the same height as the cavity area of the form outside the tube. After insertion of the tube, 12.5 pounds of chilled salted water (5.0 percent salt) at a temperature of 26° F. was poured into the center of the tube. Within 1-2 minutes, the tube was lifted vertically upward and out of the form.

Figure 6:
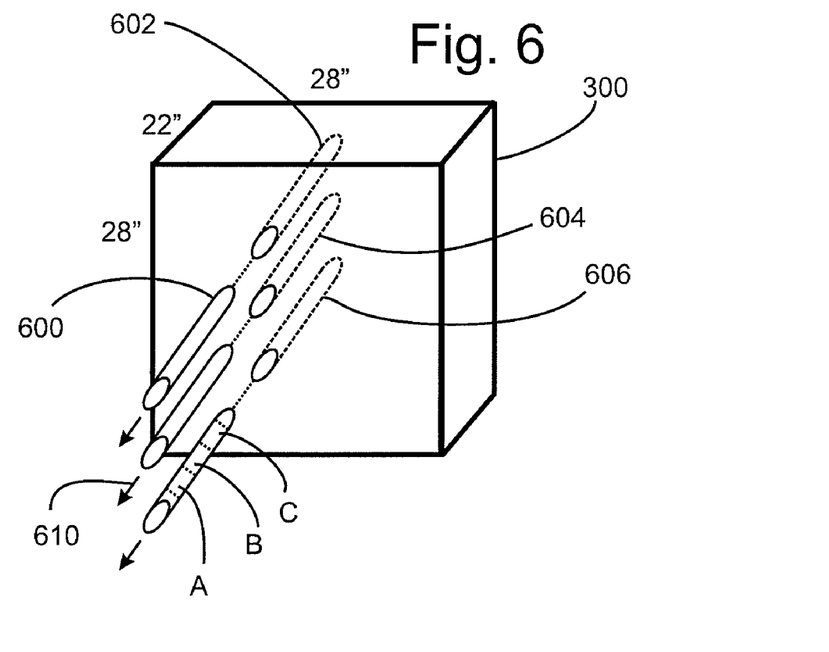
FIG. 6 is an exploded perspective view showing the block sampling plan use to measure moisture variation at different vertical and depth positions of a cheese block made in accordance with an embodiment of the present invention and a control cheese product made in a conventional manner, as described in Example 1 hereinafter.

The cheese was then treated in a normal manner. It was pressed, cooled down to 36° F. over a period of about 72 hours, and then the moisture content was measured at different locations within the mass of the cheese block. A control cheese block was prepared in a similar manner except without the brine core cooling step. After the 72 hour cooling step, the moisture content of each block was measured at different locations within the mass of the cheese block 300 using the sampling scheme shown in FIG. 6, wherein sampling points were at various cross-section depths and vertical height positions within the cheese blocks. As indicated, 11 inch sample plugs 600 were withdrawn from the cheese block in the short side (22 inch) direction of the block at three different vertical heights of the block: 602 (top), 604 (middle), and 606 (bottom) using an appropriate corning device; plugs 600 were removed from the cheese block 300 as indicated by arrow 610. Each cheese plug taken had three designated depth sections, indicated as sections A, B, and C in FIG. 6, which were each about 3.67 inches long, with section A encompassing the exterior side of the block, section C encompassing a central axial part of the block, and section B the intervening middle section. The three different vertical height positions at which samples were extracted were at 29 inches from the bottom, 15 inches from the bottom, and 1 inch from the bottom (locations 602, 604, and 606, respectively).

Table 1 describes moisture content values measured after the cooling step at the various sampling locations for the inventive cheese block representing and present invention and the control cheese block representing the prior art. The averages of the top, middle, and bottom sampling locations for each sampling depth location A, B, and C, as well as the net differences of the averages are indicated in Table 1.

TABLE 1

| | Moisture (%) | | |
|---|---|---|---|
| | A | B | C |
| Inventive | | | |
| Top | 50.27 | 50.27 | 49.95 |
| Middle | 49.58 | 49.23 | 49.28 |
| Bottom | 49.02 | 49.16 | 49.33 |
| Average | 49.62 | 49.55 | 49.52 |
| Average Net Difference | | 0.10 | |
| Control | | | |
| Top | 48.81 | 48.73 | 48.71 |
| Middle | 50.37 | 49.27 | 48.51 |
| Bottom | 50.05 | 50.02 | 48.71 |
| Average | 49.74 | 49.34 | 48.64 |
| Average Net Difference | | 1.10 | |

Figure 7:
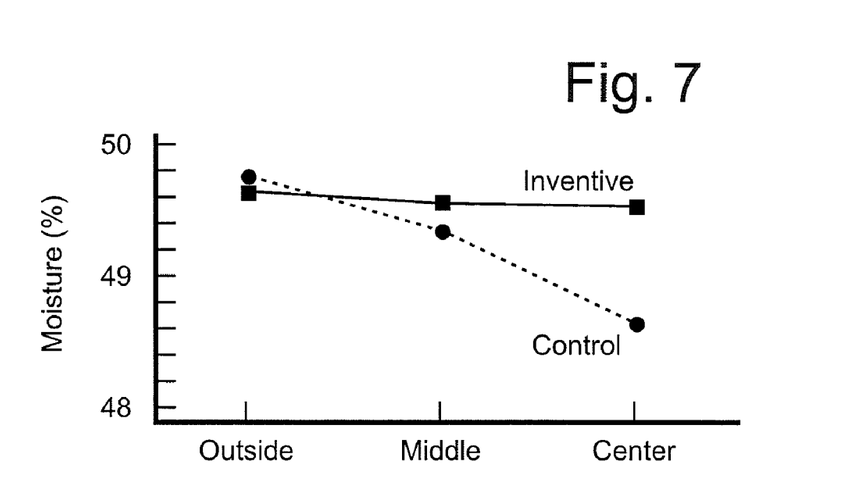
FIG. 7 is a plot showing moisture measurements at the side, middle, and center locations of a cheese block made in accordance with an embodiment of the present invention and a control cheese product made in a conventional manner, as described in Example 1 hereinafter.

FIG. 7 is a plot of the average values of the top, middle, and bottom moisture measurements for the inventive sample and the control sample. As shown by the plot, moisture variation between the center and side of the inventive sample was limited to 0.10 percent, while the control sample had a variation of 1.10 percent.

EXAMPLE 2

A similar cheese block was prepared using the injection embodiment as in Example 1 except that two 8-inch diameter PVC tubes were used to introduce the chilled brine solution. The initial temperature of the cheese curd used to fill the container was 67° F. The temperatures of the outer and central portions of the cheese cured after introduction of the chilled brine were measured and the following results were obtained.

| Time | Temperature (° F.) | |
|---|---|---|
| | Outer Portion | Central Portion |
| After Filling Container with Cheese Curd | 67 | 67 |
| After Introduction of Chilled Brine | 67 | 50.5 |
| After Pressing to Form Cheese Block* | 67 | 62 |

*Approximately 10 to 12 minutes after introduction of chilled brine.

The moisture variability of the resulting cured cheese block was similar to that found in Example 1.

EXAMPLE 3

A similar cheese block was prepared using the injection embodiment as in Example 1 except that (1) the initial temperature of the curd used to fill the container was at 80° F. and (2) the amount of chilled brine added was varied. The conditions and results were as follows:

| | Chilled Brine | | Curd Temp (° F.) | | Moisture† | | Moisture Difference | |
|---|---|---|---|---|---|---|---|---|
| Sample | Amount (lbs) | Temp. (° F.) | At Initial Fill | At Center‡ | At Edge* (%) | At Center* (%) | Absolute (%) | Relative Reduction (%) |
| Control 1 | 0 | — | 80 | — | 46.12 | 43.25 | 3.87 | — |
| Inventive 1 | 8.6 | 27 | 80 | 64 | 43.87 | 42.73 | 1.14 | 70.5 |
| Control 2 | 0 | — | 80 | — | 46.65 | 43.35 | 3.3 | — |
| Inventive 2 | 12.9 | 27 | 80 | 56 | 43.95 | 44.42 | 0.47 | 85.7 |

†Measured after 10 days in cooler (temperature at 35-40° F.).
‡Measured within a few minutes of adding chilled brine.
*Measured at a depth of 12 inches.

EXAMPLE 4

This example illustrates the intermediate temperature embodiment of the present invention. Several large cheese blocks (about 640 pounds; target moisture of about 48 percent and target fat of about 21 percent) were formed using 2 percent milk cheddar curd at an initial temperature of 70° F. A control bock was placed in the final cooler at a temperature of 38° F. for 10 days. Inventive block 1 was placed in the intermediate cooler at an intermediate temperature of 56° F. for 3 days and then placed in the final cooler at a temperature of 38° F. for 7 days; inventive block 2 was placed in the intermediate cooler at an intermediate temperature of 56° F. for 4 days and then placed in the final cooler at a temperature of 38° F. for 6 days. After 10 total days cooling, samples were taken from the center of the block, bottom corner, and top corner of each block and analyzed for moisture content. The following results were obtained.

| | Moisture (%) | | | Moisture Difference (%) | |
|---|---|---|---|---|---|
| | Bottom Corner | Core | Top Corner | Bottom Corner to Core | Top Corner to Core |
| Control | 48.5 | 44.4 | 47.9 | 4.1 | 3.5 |
| Inventive 1 | 47.2 | 45.6 | 43.9 | 1.6 | 1.7 |
| Inventive 2 | 46.9 | 45.4 | 44.6 | 1.5 | 0.8 |

The moisture difference is calculated as the absolute value of the moisture content of the corner (bottom or top) sample minus the moisture content of the core sample.

EXAMPLE 5

Example 4 was repeated and the following results were obtained.

| | Moisture (%) | | | Moisture Difference (%) | |
|---|---|---|---|---|---|
| | Bottom Corner | Core | Top Corner | Bottom Corner to Core | Top Corner to Core |
| Control | 48.7 | 46.8 | 49.1 | 2.1 | 2.3 |
| Inventive 1 | 46.9 | 46.3 | 45.8 | 0.7 | 0.5 |
| Inventive 2 | 45.7 | 44.8 | 44.1 | 0.9 | 0.7 |

EXAMPLE 6

Example 4 was repeated except that the cheese curd was a high moisture Monterey Jack marbled cheese curd and a block fill temperature of 78° F. The final product had a moisture target of 47 percent and a fat target of 26.5 percent. The following results were obtained.

| | Moisture (%) | | | Moisture Difference (%) | |
|---|---|---|---|---|---|
| | Bottom Corner | Core | Top Corner | Bottom Corner to Core | Top Corner to Core |
| Control | 47.3 | 42.4 | 45.7 | 4.9 | 3.3 |
| Inventive 1 | 46.0 | 44.7 | 43.7 | 1.3 | 1.0 |
| Inventive 2 | 45.2 | 43.7 | 42.0 | 1.5 | 1.7 |

EXAMPLE 7

This example also illustrates the intermediate temperature embodiment of the present invention Several large cheese blocks (about 640 pounds; target moisture of 43 percent and target fat of 28.5 percent) were formed using Monterey Jack curd at an initial temperature of 88° F. Control blocks were placed in the final cooler at a temperature of 38° F. for 10 days. Inventive block 1 was placed in the intermediate cooler at an intermediate temperature of 56° F. for 3 days and then placed in the final cooler at a temperature of 38° F. for 7 days; inventive block 2 was placed in the intermediate cooler at an intermediate temperature of 56° F. for 4 days and then placed in the final cooler at a temperature of 38° F. for 6 days. After 10 days cooling, samples were taken from the center core, bottom corner, and top corner of each block and analyzed for moisture content. The following results were obtained.

|  | Moisture (%) | | | Moisture Difference (%) | |
| --- | --- | --- | --- | --- | --- |
|  | Bottom Corner | Core | Top Corner | Bottom Corner to Core | Top Corner to Core |
| Control 1 | 44.4 | 40.9 | 44.2 | 3.5 | 3.3 |
| Control 2 | 43.8 | 40.1 | 44.7 | 3.7 | 4.6 |
| Inventive 1 | 42.2 | 40.9 | 41.8 | 1.3 | 0.9 |
| Inventive 2 | 42.9 | 41.1 | 42.4 | 1.8 | 1.3 |

While the invention has been particularly described with specific reference to particular process and product embodiments, it will be appreciated that various alterations, modifications, and adaptions may be based on the present disclosure, and are intended to be within the spirit and scope of the present invention as defined by the following claims.

What is claimed is:

1. A process for making a block of cheese having reduced moisture variability, said process comprising providing a bulk container having a bottom and sidewalls; introducing cheese curd having an initial temperature of about 60 to 90° F. into the container to form a cheese curd block; pressing the cheese curd block to form a cheese block; controlled cooling of the cheese curd block or cheese block to a final temperature of less than 45° F. over a total period of about 7 to about 13 days to form a final cheese block, wherein the controlled cooling is effective to provide a reduced moisture content variation between a geometric center and side edges of the final cheese block as compared to a similar cheese block cooled directly to 45° F. over the total period and wherein the final cheese block has a weight of at least about 500 pounds.

2. The process of claim 1, wherein the controlled cooling comprises first cooling at least one portion of the cheese curd block in the container to a temperature about 5 to about 50° F. below the initial temperature and then cooling the cheese block prepared therefrom to the final temperature to form the final cheese block; and wherein the cooling of the at least one portion is effected by introducing a chilled brine solution, a chilled whey composition, a chilled cheese curd mixture, a chilled gas, or a cooling device having a recirculating coolant into the at least one portion of the cheese curd block.

3. The process of claim 2, wherein a plurality of portions within the cheese curd block are cooled to about 5 to about 50° F. below the initial temperature and wherein the cooling of the plurality of additional portions is effected by introducing the chilled brine solution, the chilled whey composition, the chilled cheese curd mixture, the chilled gas, or a plurality of cooling devices having the recirculating coolant into the plurality of additional portions of the cheese block.

4. The process of claim 2, wherein the at least one portion of the cheese curd block is cooled to a temperature about 10 to about 45° F. below the initial temperature.

5. The process of claim 3, wherein the plurality of portions of the cheese curd block are cooled to a temperature about 10 to about 45° F. below the initial temperature.

6. The process of claim 2, wherein the at least one portion of the cheese curd block is cooled to a temperature about 20 to about 45° F. below the initial temperature.

7. The process of claim 3, wherein the plurality of portions of the cheese curd block are cooled to a temperature about 2 to about 45° F. below the initial temperature.

8. The process of claim 2, wherein the cheese block has dimensions of about 24 to about 30 inches, and the cheese block has a moisture content variation of no greater than 2.0 percent between a location at a geometric center thereof and a side edge portion.

9. The process of claim 8, wherein the moisture content variation is no more than 1.0 percent between the location at the geometric center and the side edge portion thereof.

10. The process of claim 8, wherein the moisture content variation is no more than 0.5 percent between the location at the geometric center and the side edge portion thereof.

11. The process of claim 3, wherein the cheese block has dimensions of about 24 to about 30 inches, and the cheese block has a moisture content variation of no greater than 2.0 percent between a location at a geometric center thereof and a side edge portion.

12. The process of claim 11, wherein the moisture content variation is no more than 1.0 percent between the location at the geometric center and the side edge portion thereof.

13. The process of claim 11, wherein the moisture content variation is no more than 0.5 percent between the location at the geometric center and the side edge portion thereof.

14. The process of claim 2, wherein the final cheese block has a substantially symmetrical cross-sectional shape selected from the group consisting of square, rectangular, triangular, and circular and wherein the final cheese block is a cheese selected from the group consisting of Cheddar, Monterey Jack, and Colby.

15. The process of claim 3, wherein the final cheese block has a substantially symmetrical cross-sectional shape selected from the group consisting of square, rectangular, triangular, and circular and wherein the final cheese block is a cheese selected from the group consisting of Cheddar, Monterey Jack, and Colby.

16. A process for making a block of cheese having reduced moisture variability, said process comprising forming a cheese block using cheese curd having an initial temperature of about 60 to 90° F.; controlled cooling of the cheese block to a final temperature of less than 45° F. over a total period of about 7 to about 13 days to form a final cheese block, wherein the controlled cooling is effective to provide a reduced moisture content variation between a geometric center and side edges of the final cheese block as compared to a similar cheese block cooled directly to 45° F. over the total period and wherein the final cheese block has a weight of at least about 500 pounds.

17. The process of claim 16, wherein the controlled cooling comprises first cooling at least one portion of the cheese block to a temperature about 10 to about 50° F. below the initial temperature and then cooling the cheese block prepared therefrom to the final temperature to form the final cheese block; and wherein the cooling of the at least one portion is effected by introducing a chilled brine solution, a chilled whey composition, a chilled cheese curd mixture, a chilled gas, or a cooling device having a recirculating coolant into the at least one portion of the cheese curd block.

18. The process of claim 17, wherein a plurality of portions within the cheese curd block are cooled to about 10 to about 50° F. below the initial temperature and wherein the cooling of the plurality of additional portions is effected by introducing the chilled brine solution, the chilled whey composition, the chilled cheese curd mixture, the chilled gas, or a plurality of cooling devices having the recirculating coolant into the plurality of additional portions of the cheese block.

19. The process of claim 17, wherein the at least one portion of the cheese curd block is cooled to a temperature about 20 to about 45° F. below the initial temperature.

20. The process of claim 18, wherein the plurality of portions of the cheese curd block are cooled to a temperature about 20 to about 45° F. below the initial temperature.

* * * * *